United States Patent [19]
Uchida et al.

[11] 3,933,533
[45] Jan. 20, 1976

[54] METHOD AND APPARATUS FOR INITIATING SCARFING

[75] Inventors: Youtaro Uchida; Goro Miya; Kazuo Kobayashi; Masayuki Oguni; Tomokazu Yoshimura; Naoteru Yonemori, all of Tokai; Teruo Kameyama, Gifu, all of Japan

[73] Assignee: Nippon Steel Corporation, Japan

[22] Filed: Apr. 18, 1974

[21] Appl. No.: 462,175

[30] Foreign Application Priority Data

| Apr. 18, 1973 | Japan | 48-43943 |
| Aug. 6, 1973 | Japan | 48-87630 |
| Aug. 6, 1973 | Japan | 48-87631 |
| Aug. 6, 1973 | Japan | 48-87634 |
| Aug. 6, 1973 | Japan | 48-88178 |
| Aug. 6, 1973 | Japan | 48-88180 |

[52] U.S. Cl. ............... 148/9.5; 266/23 H; 266/23 P
[51] Int. Cl.² ...................... B23K 7/06; B23K 7/08
[58] Field of Search ........... 148/9.5; 266/23 H, 23 P

[56] References Cited
UNITED STATES PATENTS

| 2,309,096 | 1/1943 | Bucknam et al. | 266/23 H |
| 2,513,425 | 7/1950 | Lobosco | 266/23 H |
| 3,658,599 | 4/1972 | Svensson et al. | 148/9.5 |

FOREIGN PATENTS OR APPLICATIONS

| 471,032 | 1/1951 | Canada |

*Primary Examiner*—W. Stallard
*Attorney, Agent, or Firm*—Wenderoth, Lind & Ponack

[57] ABSTRACT

In the method of scarfing surface defects of to-be-scarfed metal material as said material is moving relative to the scarfing machine with scarfing nozzle, the improvement, which comprises a step of supplying oxygen into the consumable electrode pipe so provided as to be directed to a scarfing point on the surface of said to-be-scarfed metal material, for jetting the oxygen from the tip of said electrode pipe, a step of feeding said electrode pipe until its tip contacts said metal material, a step of heating rapidly the contacting portion respectively of said electrode pipe and of said metal material with electrical energy and heat of oxidation so that the temperature of such portion may rise to scarfing start temperature, and a step of initiating the scarfing process instantaneously from such temperature rising portion with the oxygen jetted to said scarfing nozzle.

10 Claims, 11 Drawing Figures

3,933,533

METHOD AND APPARATUS FOR INITIATING SCARFING

BACKGROUND OF THE INVENTION

The present invention relates to a method and an apparatus for scarfing surface defects of metal material, more particularly to a method of and an apparatus for instantaneously initiating such scarfing process.

In the usual case of conditioning, that is, removing defects of such products of iron works as steel slabs, blooms and billets with a scarfing machine, cold steel is so pretreated that its defects (hereinafter called the scarfing points) are heated locally with heat supplied from the scarfing nozzle until the temperature of the scarfing points has risen to such a degree as to make it susceptible of scarfing initiation. However, the temperature of the pre-heating flames issued from the scarfing nozzle is so low, and the heat thereof is so little, that a long time is required to raise the temperature of the scarfing points to the level for scarfing; the heat has mostly been transmitted into the inside of such steel piece because of high heat conductivity. This means low efficiency in the conditioning of such steel, particularly when it has a great number of defects on the surface.

In order to raise efficiency, effort has been exerted to shorten the time for scarfing initiation in the following ways:

1. Providing another nozzle for jetting metal powder in front of the scarfing nozzle, so that iron powder of 100 to 300 mesh is jetted into pre-heating flames. The vehement combustion heat energy produced by such iron powder combined with oxygen and the mechanical energy produced by the jets of iron powder heat, at a blow, the scarfing points locally, thereby making even cold steel susceptible of scarfing initiation in 4 or 5 seconds.

2. Sending forward a metal rod of small diameter (starting rod) until it contacts the scarfing points on the surface of to-be-scarfed metal material in front of the scarfing nozzle, and then heating the tip of said rod with the pre-heating flames issued from said scarfing nozzle, so that the tip of said rod melts continuously to produce droplets which heat or melt the surface defects of the material. Then scarfing oxygen is jetted from said scarfing nozzle toward the heated or molten scarfing points, to initiate the scarfing process.

However, such methods as mentioned above, have the following disadvantages: In the method (1), the nozzle for jetting metal powder may possibly have the jetting holes cloaked with spreading scarfing slag; the metal powder supplying device is difficult to operate; and it is impossible to initiate the scarfing process, while the to-be-scarfed metal material is travelling. Also, in the method (2), it takes 6 to 10 seconds before scarfing initiation, making impossible a flying start; such a long time required for scarfing intiation may cause excessively deep scarfing of the scarfing points, which should be avoided in the scarfing process.

For the scarfing of the side of a steel piece by any conventional scarfing method, it is necessary to turn up the side to be scarfed by an upper surface scarfing machine or provide another machine for scarfing the side of the steel pieces, making it necessary to also provide a reversing device in the former case or take a long time to scarf the side as well as the upper surface, hence much lower operation efficiency in the latter case.

SUMMARY OF THE INVENTION

Having been designed to solve the abovementioned problems with the conventional methods, the present invention has an object to provide a method of and an apparatus for scarfing surface defects of metal material capable of initiating the scarfing process instantaneously.

Another object of the present invention is to provide a scarfing method and a scarfing apparatus so efficient that the scarfing process can be initiated while the to-be-scarfed material is travelling, without stopping the movement of the material relative to the scarfing machine.

A further object of the present invention is to provide a scarfing method and a scarfing apparatus capable of initiating the scarfing process exactly, without danger of excessively deep scarfing, for complete removal of surface defects of the metal material.

A further object of the present invention is to provide a scarfing method which is applicable to the scarfing of the side of the to-be-scarfed metal material with the same effects as in the scarfing of the upper surface of such material, without using any special accessories for the purpose of scarfing the side of metal material.

The abovementioned objects and other objects will appear more clearly when reference is made to the detailed explanation and preferred embodiments mentioned below.

In order to obtain all the above objects, the method for initiating scarfing or the present invention is designed as an improvement of the method from the scarfing surface defects of to-be-scarfed metal material while said material is moving relative to the scarfing machine using scarfing nozzles, which comprises a step of supplying oxygen into the consumable electrode pipe so provided as to be directed to a scarfing point on the surface of said to-be-scarfed metal material, for jetting oxygen from the tip of said electrode pipe; a step of feeding said electrode pipe until its tip contacts said metal material; a step of heating rapidly the contacting portion, respectively, of said electrode pipe and of said material withh electrical energy and heat of oxidation so that the contacting portions may rise to the scarfing start temperature; and a step of initiating the scarfing process instantaneously from such temperature rise portion with the oxygen jetted from said scarfing nozzle.

DESCRIPTION OF THE PREFERRED EMBODIMENTS

The following is a detailed explanation of the scarfing method of the present invention applied to a steel slab as the to-be-scarfed material.

Figure 1:
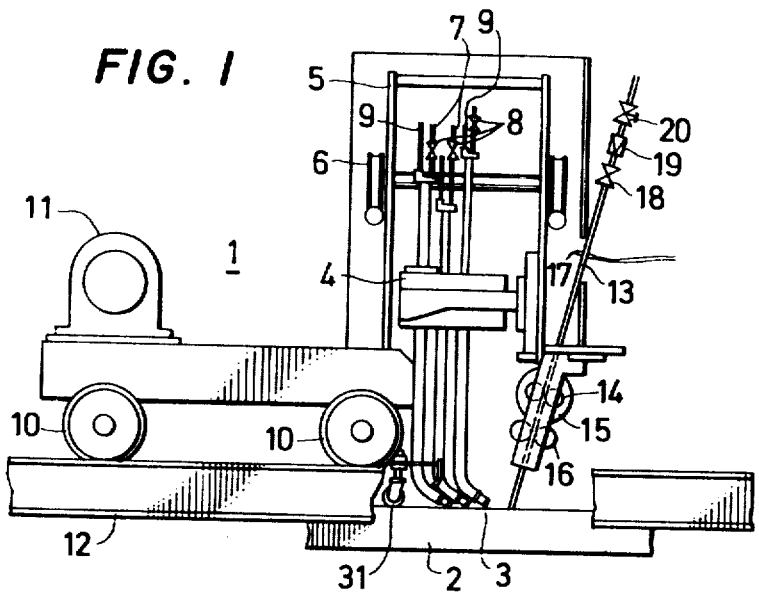
FIG 1 is a front view of an embodiment of a scarfing machine for the practice of the scarfing method of the present invention

Referring to FIG. 1, an automatic, self-running scarfing machine 1 is placed, with its wheels 10, on rails 12 laid outside the respective sides of slab 2 along its long direction in such a manner as to bridge over the slab 2; it operates under the force of its own motor 11. There sits on the body of the scarfing machine 1 one or a plurality of scarfing nozzles 3 (three sets in the case of the figure), supported by a fixing stand 4. Such nozzles are provided at a certain angle against the surface of the slab 2 (for instance, 20° to 25°). At the rear end, said scarfing nozzles 3 are connected respectively with an oxygen supplying pipe 7, a regulating solenoid valve 8, and a gas mixture (for example of coke oven gas and oxygen) supplying pipe. Said fixing stand 4 for supporting the scarfing nozzles 3 is held onto the carriage 5 which is movable on its wheels 6 along the rails in the direction of width of the slab 2 within the scarfing machine 1.

Thus, the scarfing nozzles 3 are movable both along the length and width of the slab 2. At the lower part of said carriage 5, these is provided an electrode pipe feeding device which supports a consumable electrode pipe 13 to be directed to a scarfing point in the projecting direction of the scarfing nozzles 3 (that is, the point where the extension line of the scarfing nozzles 3 reaches the surface of the slab), and which feeds such pipe 13 to the scarfing point from the direction opposite to the scarfing nozzles 3. The electrode pipe feeding device is constructed with feed roller 14 and a side roller 16 which rotate alternately during the operation of the motor 15. The electrode pipe 13 is moved forward or taken back from the scarfing point as it is supported between these rollers 14 and 15 in the state of insulation. To this consumable electrode pipe 13 is connected a terminal 17 for introducing current from the source of arc production; the rear of the electrode pipe 13 is connected to the oxygen supplying device for blowing oxygen into said pipe 13. Said device is equipped with a solenoid valve 18 for regulating the flow and stoppage of the oxygen supply and also a flow meter 19 and a discharge regulating valve 20.

The following is an explanation of the operation procedure of said scarfing machine:

As the scarfing machine 1 is travelling under the operation of the motor 11 along the rails 12, a button switch therefore (not shown) is pushed when the machine 1 reaches the position where there is a defect of the slab 2 to be scarfed, so that oxygen is jetted from the scarfing nozzles 3. Then, the button switch of the electric source for scarfing initiation is pushed, and the solenoid valve 18 is released so that the oxygen is sent through the flow meter 19 to the electrode pipe 13 to be jetted from its tip. At nearly the same time, the feed motor 15 starts to rotate the feed roller 14 so that the electrode pipe 13 is sent down to the scarfing point of the slab 2 from the direction opposite to the scarfing nozzles 3.

When the tip of the electrode pipe 13 contacts the scarfing point on the surface of the slab 2, a short-circuit current is introduced, and an arc is produced between the electrode pipe 13 and the slab 2. By means of electrical energy generated as Joule effect and arc effect at the time of contact, the tip of the electrode pipe 13 is rapidly heated and melted, thus raising the temperature of the contacting portion. At the same time, the contacting portion is oxidized, during combustion, with oxygen jetted from the tip of the electrode pipe 13, furthering the heating and temperature-rise of the electrode pipe 13 and the surfaces of the slab 2, so that the contacting portion quickly reaches readily the scarfing start temperature necessary for scarfing initiation.

The scarfing operation starts instantaneously from this temperature rising position by jetting oxygen from said scarfing nozzles 3. At the same time as the scarfing initiation, the motor 15 rotates reversely, so that the electrode pipe 13 is taken up, and the supply of oxygen to the electrode pipe 13 is stopped. As mentioned above, the heating and temperature-rise of the contacting portion of the electrode pipe 13 and the slab 2 are made rapidly by the multiplication action of the electrical energy and the oxidation heat, so that the time from the contact of the electrode pipe 13 with the scarfing point to scarfing initiation is 0.1 to 0.5 second. Therefore, scarfing initiation can be made instantaneously, thus making scarfing possible in a stabilized state even while the scarfing machine is travelling. The abovementioned scarfing start temperatue is generally more than 1350°C.

As mentioned above, the distance between the scarfing nozzles and the slab, the angle at which the electrode pipe is fed to the slab, and the selection in the kind of power source are important factors for stable scarfing initiation without excessively deep scarfing. According to the experiment conducted by the inventors of the present invention, it is confirmed that the distance between the scarfing nozzles and the surface of the slab, the angle at which the electrode pipe is slant to the slab and the kind of current fed from the power source to the electrode pipe should best be respectively: 5 to 10 mm, within a range from 30° to 90°, and direct current.

Figure 2:
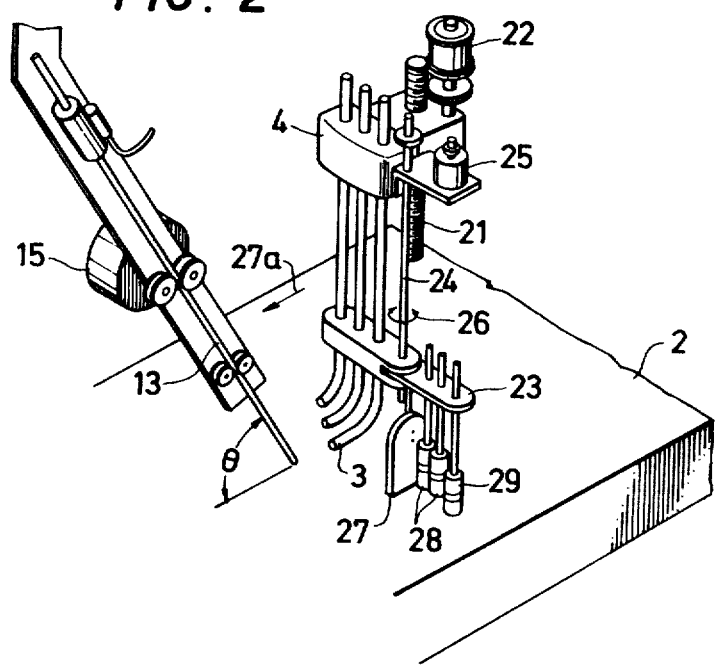
FIG. 2 is a detail view of the electrode pipe feeder and the scarfing nozzle of the scarfing machine.
Figure 3:
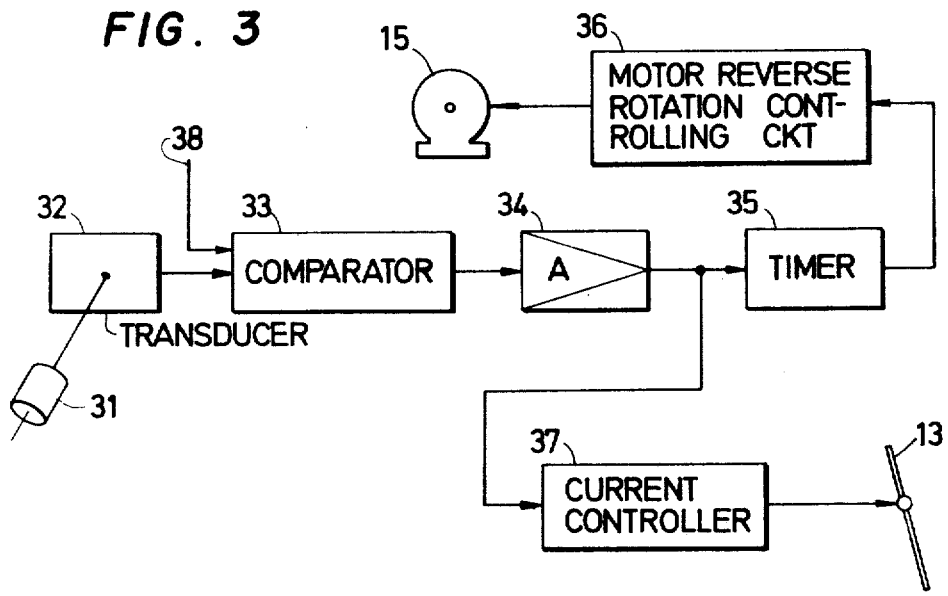
FIG. 3 is a block diagram of the controlling device for use in scarfing initiation.

FIGS. 2 and 3 show the scarfing machine of the present invention and the controlling device therefor constructed with the purpose of stable scarfing initiation under the abovementioned operating conditions.

In FIG. 2 are shown the electrode pipe feeding part and the scarfing nozzles part of the scarfing machine. The corresponding parts between FIG. 1 and FIG. 2 share the same numbers. In FIG. 2, a screw rod 21 (which may be substituted by a rack) is provided, and a scarfing nozzle fixing stand 4 slides on said rod 21, such sliding being motivated by a motor 22 and more specifically by the worm sliding on the rotation of the motor 22. Furthermore, there is a heat shielding plate 27, a level detector 28 for measuring the distance between the scarfing nozzles and the slab, and a marking detector 29. These items 27, 28 and 29 are fixed to a stand 23 for holding the detectors, which stand is so devised as to rotate about a roll 24 as indicated by the arrow head 26. A motor 25 rotates the rod 24 and the stand 23 for holding the detectors in the direction indicated by arrow head 26. The screw rod 21 is fixed on the carriage. In the case of such construction, the distance between the surface of the slab 2 and the scarfing nozzles 3 is measured by the level detector 28, which is converted into an output signal; the comparison between the output signal and the reference signal which corresponds to the pre-determined distance is fed back as the controlling signal to the motor 22, so that the height of the scarfing nozzles is automatically adjusted to the pre-determined value. When either the level detector 28 or the marking detector 29 is beyond the end of the slab, the signal therefrom will change so that the motor 25 starts to rotate the stand 23 as indicated by the arrow head 26 to keep all the detectors above the slab 2.

Again, in the case of such construction as mentioned above, scarfing initiation is ensured in the following manner:

Referring to FIG. 2, on the assumption that the electrode pipe 13 and the scarfing nozzles move sychronously, in the direction indicated by the arrow head 27a, the angle formed between the tip of the electrode pipe 13 and the surface of the slab 2 is set between 30° and 90°; the electrode is connected to a DC source circuit; and the distance between the scarfing nozzles 3 and the surface of the slab 2 is set between 5 and 10 mm. Furthermore, arc production is continued until molten droplets of the electrode pipe drop onto the slab 2. The distance between the surface of the slab 2 and the scarfing nozzles 3 will be maintained between 5 and 10 mm in spite of the unsmoothness of the surface of metal material, by means of the level detector 28, the motor 22 and the controlling circuit therefor. Thus, the deepness of the scarfing is constant irrespective of the unsmoothness of the to-be-scarfed metal material. The reasons for slanting the electrode pipe 13 at an angle between 30° and 90° are: First, to make the stip end of the electrode pipe 13 contact the surface of the slab 2 while the electrode pipe 13 and the scarfing nozzles 3 are moving as indicated by the arrow head 27a shown in FIG. 2; and secondly, to produce arc energy and droplets of the electrode concentrated in the direction toward the scarfing nozzles 3.

Also, the slanting of the electrode pipe 13 makes a smaller contacting area with the slab 2 and a higher current density, thus advantageously promoting oxidation through the priority in melting given to the inside corner of the electrode pipe 13.

The reason of supplying DC current to the electrode pipe 13, and not AC current is: The supply of DC current permits the production of a scarfing initiating arc of constant quality all the time, thus ensuring the stability of scarfing initiation, while AC current requires scarfing initiation to depend on the phase of the current and voltage at (before and after) the time of contact between the electrode pipe 13 and the slab 2. The production of the arc is continued until droplets of the electrode pipe drop onto the slab in the following way: As shown in FIG. 1, a speed detecting roller 31 is provided or the scarfing machine 1, and said roller 31 is connected with a transducer 32 for converting speed into electric volume, such as tachometer generator. The difference between the output signal issued by the transducer 32 and the reference signal 38 (corresponding to the reference speed) issued by using the comparator 33 is made into an output signal as the difference signal. This signal is amplified by an amplifier 34 and used for setting the time limit on the timer 35. The timer 35 is used to set the time limit for motor reverse rotation controlling circuit 36; that is, the time between the contact of the tip of the electrode pipe 13 with the slab 2 at the normal rotation of the motor 15, thus producing the arc, and the finish of the scarfing initiation. In other words, the higher the relative speed, the longer the time of feeding the electrode pipe 13. When the scarfing machine is so constructed, it is possible to continue the production of the arc until droplets of the electrode pipe drop onto the to-be-scarfed metal material, as mentioned above, at any relative speed between the electrode pipe 13, or the scarfing nozzles 3, and the slab 2.

As for the term "to drop" used herein, it means not only droplets of molten metal falling onto the slab, but also such droplets as stay there.

As mentioned above, scarfing initiation can be made nearly assuredly, but when the relative speed is very great, the temperature of the metal surface below the electrode pipe 13 rises insufficiently, which leads to a higher rate of failure in scarfing initiation, hence the following procedure is taken:

Referring to FIG. 3, the current controller 37 is so controlled by the output signal issued by the amplifier 34 as to make greater the volume of current supplied to the electrode pipe 13 if the relative speed is great, and vice verse. Besides the above, a circuit of the electrode pipe 13 may be constructed with a plurality of condensers arranged in a row, so that the number of such condenser to be connected at the same time with the electrode pipe 13 may be decided according to the relative speed.

Figure 4:
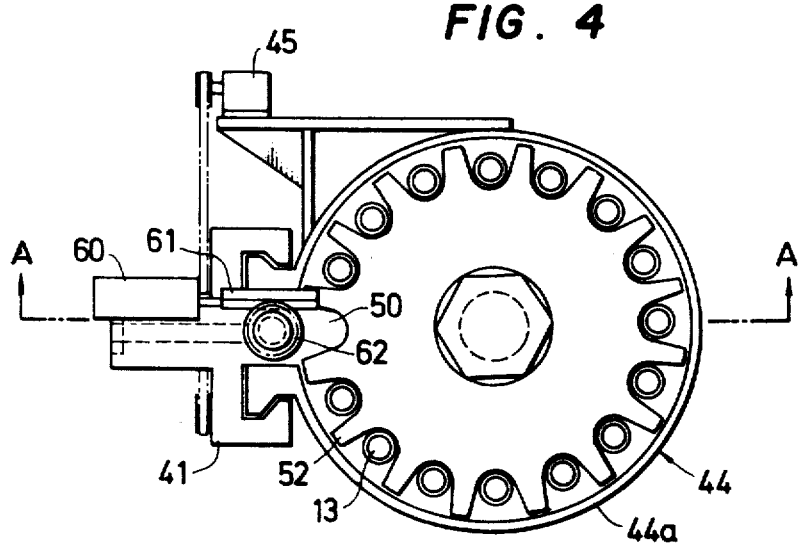
FIG. 4 is a plane view of an embodiment of the electrode pipe feeding device and the oxygen supplying device of the scarfing machine of the present invention.
Figure 5:
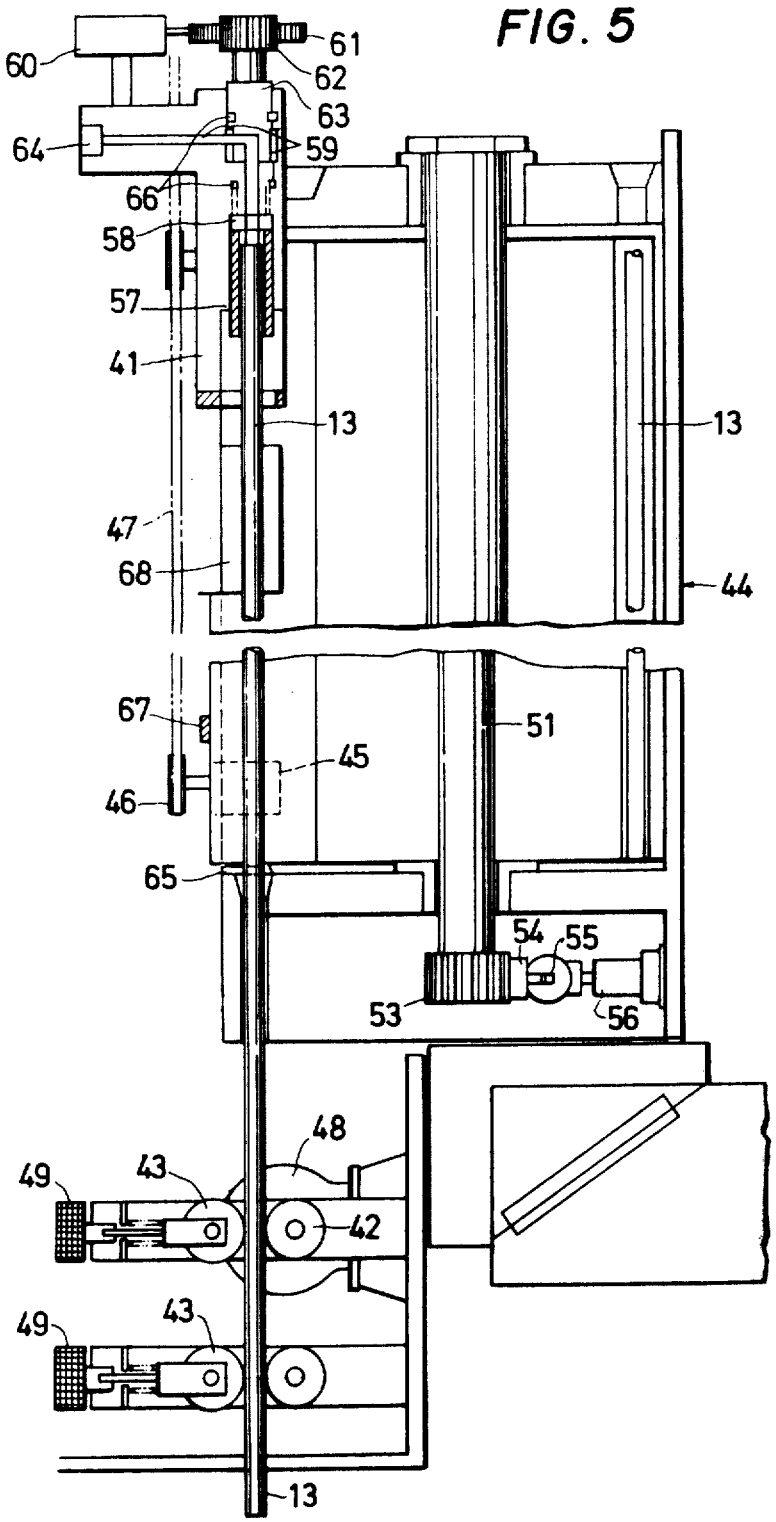
FIG. 5 is a vertical section of the devices of FIG. 4 on the line A—A.

As the electrode pipe according to the present invention is consumed through melting at scarfing initiation, it must be replaced by a new one when it is consumed and becomes too short to be usable any more. It is also necessary to supply, without fail, oxygen to such electrode pipe which is getting shorter. FIGS. 4 and 5 show an embodiment of the electrode pipe feeding device and the oxygen supplying device.

The electrode feeding device is constructed with the slider 41 which is free for vertical movement for feeding the electrode pipe 13 to the scarfing point while the top-end of the pipe is being held thereby, and drive rollers 42 and guide rollers 43 which hold the tip end side of the electrode pipe 13 for feeding the electrode pipe as required. The slider 41 is set for free sliding along one side of the casing 44 which is described below; it is driven by a pulley 45 driven by a motor 45 fixed on the casing 44. Another pulley is provided above the casing 44 (not shown) and belt 47. The slider 41 itself is fixed at an appropriate position on the belt 47, so that the former slides vertically together with the motion of the latter. As for the driving method of the slider 41, any known method may be adopted. A motor 48 is provided for driving the drive rollers 42, and the guide rollers 43 are connected with magnetic coils 49, so that the former can be released at the operation of the latter to drive out the electrode pipe 13.

The casing 44 is to supply the electrode pipe 13 piece by piece to the electrode pipe feeding device; it is constructed with an outer shell 44a and a rotating plate 52 which has a great number of electrode pipe accomodating spaces around itself and which rotates together with a shaft 51 in contact with the inside of the outer shell 44a. At the lower end of the shaft 51 there is a pinion gear 53 engaged with a rack 54 which is connected to a cylinder 55 and a force cylinder 56 for rotating the shaft 51. Because the casing 44 is held at a slant, as shown in the figures, and the electrode pipe feeding device is set on the slant side, the electrode pipe 13 moves to the feeding device under its own by weight. As for the feeding method of the casing 44, it need not be limited to the rotary system as shown in the drawing, but any method, including the straight line system, can be used.

As for the oxygen supplying device, it is provided inside and at the upper part of said slider 41; it is constructed with a cylindrical packing 57 which holds and tightly encloses the upper end of the electrode pipe 13, a ring 58 which is free for vertical movement for ppressing said packing 57, and an oxygen supplying part for supplying oxygen into the electrode pipe 13 through the ring 58. The vertical movement of the ring 58 is made by the rotation of the inner shell 63 which is screwed into the upper part of the slider 41 together with a pinion gear 62 engaged with a rack 61 which is reciprocated by an air cylinder 60. The oxygen supplying part 59 is connected to an oxygen supplying source (not shown) through a connecting screw 64.

Said cylindrical packing 57 has an inside diameter somewhat greater than the outside diameter of the electrode pipe 13, so that it permits the passage of the electrode pipe 13, but when the ring 58 iss pressed from above, the packing 57 is also pressed, thereby creating a smaller inside diameter so as to get close to and hold the electrode pipe 13.

In FIG. 5, a shutter 65 for supporting the electrode pipe 13 is provided at a set position on the bottom of the electrode pipe feeding device to prevent the electrode pipes 13 in the casing 44 from falling. Also present are a seal packing 66, a limit switch 67, and a power supplying device 68 to the electrode pipe.

The following is explanation of the operation procedure of the apparatus shown in FIGS. 4 and 5;

The explanation begins with the situation where the electrode pipe supplying device has no pipe and the slider 41 in the uppermost position.

Following at one pitch rotation of the shaft 51 of the casing 44 so as to have the electrode pipe accommodating spaces 50 correspond with the electrode pipe feeding device, the electrode pipe 13 will fall into the feeding device under its own weight. During that time, the shutter 65 on the bottom of the device remains closed. When the electrode pipe 13 is set at the pre-determined position, the motor 45 is operated to lower the slider 41 until the upper end of the electrode pipe 13 hits the ring 58 above the packing 57. When the electrode pipe 13 contacts the ring 58 with a prescribed pressure, the motor 45 stops, but the air cylinder 60 works to rotate the inner shell 63 through the rack 61 and the gear 62, so as to push the ring downward and press the packing 57. The pressing of the packing 57 leads to its tight contact with the electrode pipe 13 to produce a tight enclosure of the electrode pipe 13, so that oxygen is supplied into the electrode pipe 13 without leakage. Under these conditions, the shutter 65 is opened, and the motor 45 is operated to further lower the slider 41. The electrode pipe 13 tip is then introduced between the drive and guide rollers 43 and moved by the feeding motor 48 until it stops near the scarfing point. For the procedure to be taken after this situation, refer to the abovementioned.

At the same time with scarfing initiation, the supply of current and oxygen is stopped, and the electrode pipe is taken back to the original position.

As the scarfing is repeated, the electrode pipe 13 will become too short to be used any further when the slider 41 reaches the lower limit. At that time, the cylinder 60 starts operating to rotate the inner shell 63 by means of the rack 61 and the gear 62, thus, stopping pressing of the ring 58, which, therefore, raises so as to release itself from the pressing of the packing 57 and the supporting of the electrode pipe 13. The unused part of the electrode pipe 13 is driven downward by the motor 48 for the drive rollers 42 until it reaches the prescribed position, where it is driven out through the release of the guide rollers 43. After having thus removed the electrode pipe 13, the slider 41 raises during the operation of the motor 45 to the uppermost position where it waits for next electrode pipe 13. Thus, the above procedure is repeated. The following is an explanation of the controlling means for the feeding of the electrode pipe 13 by reference to FIG. 6.

Figure 6:
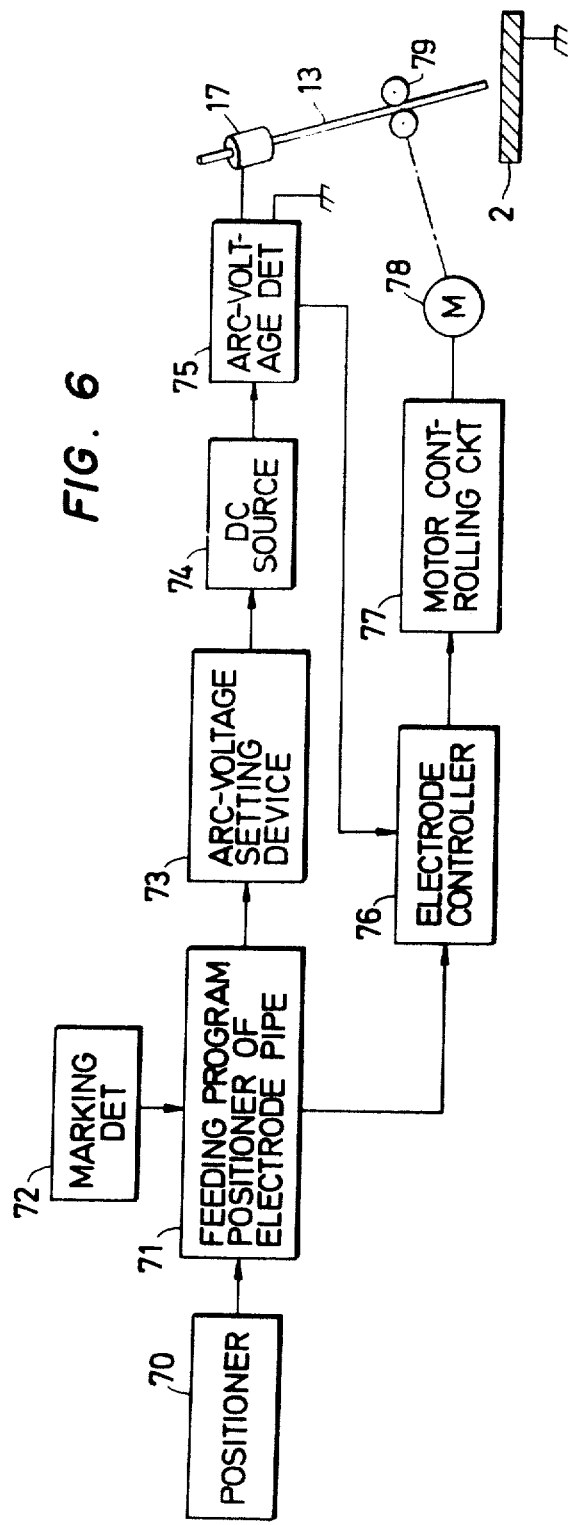
FIG. 6 is a block diagram of the circuit for controlling the feeding of the electrode pipe.

FIG. 6 is a block diagram of the circuit for controlling the feeding of the electrode pipe. A travelling speed setting positioner 70, sets the running speed of the carriage through the adjustment of the revolution of the motor. Signals corresponding to the set speed are sent to feeding program positioner of electrode pipe 71 at the next step. A marking detector 72 detects marks put on to-be-scarfed metal material and sends these detected marks to the feeding program positioner of the electrode pipe 71 in the form of a detection signal. The device 71 has previously been programmed with an arc maintaining time and an electrode pipe feeding speed according to the quality of to-be-scarfed metal material, the travelling speed of the device, and other parameters which influence the scarfing process. When signals corresponding to the quality of to-be-scarfed metal material, its surface, and travelling speed are sent to the feeding program positioner 71, this device 71 converts this information into output signals corresponding to arc voltage (V), electrode contacting time ($t$) and electrode feeding speed ($v$). The arc voltage signal (V) is sent into the arc-voltage setting device 73, and electrode contacting time signal ($t$) and electrode feeding speed signal ($v$) are sent into the electrode controller 76. The arc-voltage setting device 73 controls the DC current source 74 according to the arc voltage signal (V), so that current of the required voltage is supplied to form the DC source 74. The electrode controller 76 is equipped with a timer for controlling, in terms of time, the switching of the motor from the positive rotation to the reverse rotation and with a device for controlling the speed of the motor, and it controls the motor controlling circuit 77.

In the cooperation with the abovementioned construction, at the input of the mark detecting signal issued from the marking detector 72, the feeding program positioner 71 converts that signal into a DC current source "on" signal according to the previously set program and sends this signal to the power source 74 through the arc-voltage setting device 73. At the same time, the feeding program positioner sends a positive rotation signal to the electrode controller 76, so that a motor 78 will rotate positively to drive the rollers 79 which supply the electrode pipe 13 downward to the slab 2. At the moment of contact between the electrode pipe 13 and the slab 2, a short-circuit current is introduced, and an arc is produced. During the production of the arc after the Joule heating a short-circuit arc-voltage detector 75 sends an arc production signal to the electrode controller 76, so as to lower the electrode pipe feeding speed (V) of the motor 78. The electrode pipe feeding speed (V) has been so determined by the motor rotation controlling device equipped to the electrode controller 76 that molten droplets of the electrode pipe 13 drop just onto the slab 2. Following the time for the molten droplets of the electrode pipe 13 to drop on the metal material (such time to be determined by the feeding program positioner 71), the timer of the electrode cntroller 76 switches the motor 78 from the positive rotation to the reverse rotation. During this switching, the electrode pipe 13 is taken up at the speed set by the program setting-device.

As mentioned above, the electrode pipe 13 is fed at a prescribed speed, but it is fed at a lower speed during arc production, thereby making it possible to maintain a stable arc.

Figure 7:
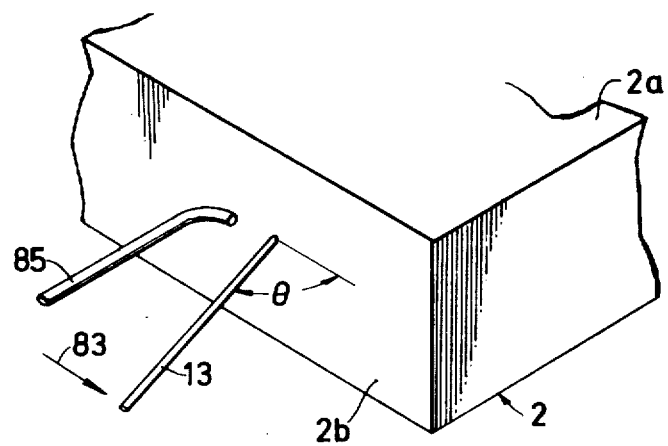
FIG. 7 is a view for explaining the relation in position between the scarfing nozzle and the electrode pipe when the method of the present invention is applied to the side of the to-be-scarfed material.
Figure 8:
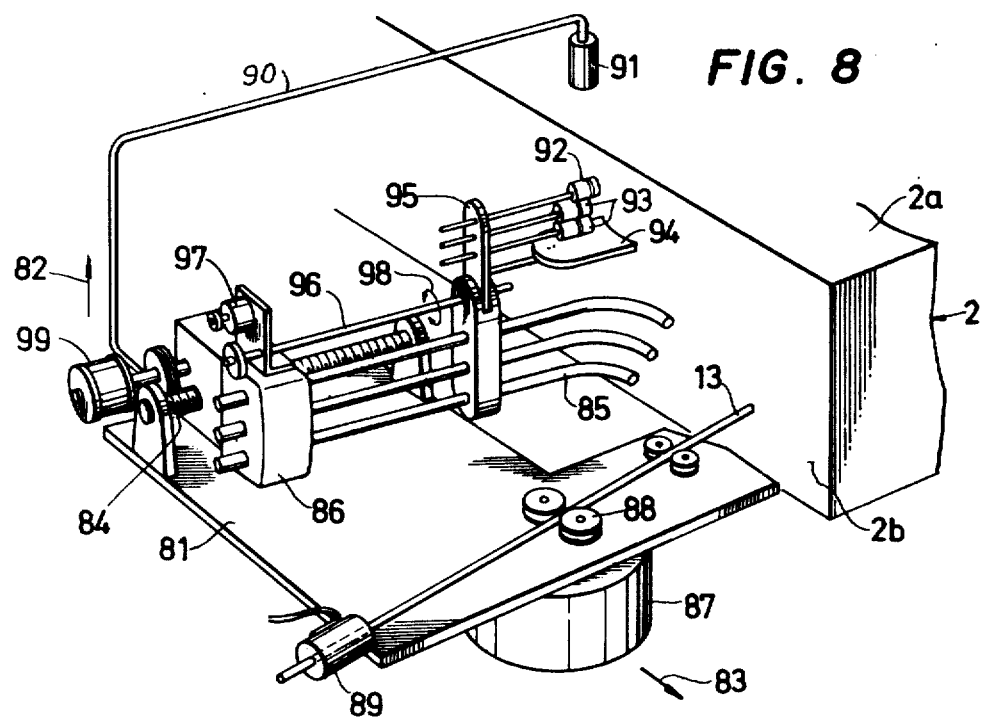
FIG. 8 is an explanatory view of the main portion of the scarfing machine being applied to the scarfing of the side of the to-be-scarfed material.

The method of the present invention is applicable to the scarfing process of the side of the to-be-scarfed metal material (slab). FIGS. 7 and 8 show the mechanism of the side scarfing apparatus and its controlling device.

In these figures, the to-be-scarfed metal material 2 (slab) has respectively a top plane 2a and a side 26. A supporting base 81 is fixed on a vertically moving carriage (not shown) making it is vertically movable with the carriage in the direction indicated by the arrow head 82 or in the opposite direction. The vertically moving carriage is set on another carriage (not shown) movable as indicated by arrow head 83 or in the opposite direction. Therefore, the supporting base 81 is movable as indicated by the arrow heads 82 and 83, or in their opposite directions. On the supporting base 81, there is fixed a screw rod 84, along which the stand 86 supporting the scarfing nozzles 85 slides. Such sliding is achieved by using the engagement between a worm (not shown) connected with a motor 99 and the screw rod 84. The electrode pipe 13 is connected with an oxygen supplying device to be supplied with oxygen, and it is moved toward the slab 2 or in the opposite direction by means of a motor 87 by the electrode pipe feeding rollers 88. A terminal 89 supplies power to the electrode pipe 13. The supporting base 81 has a plane level detector 91 fixed through a rod 90. A marking detector 92, a side level detector 93, and a heat shielding plate 94 are fixed to the detector supporting stand 95, which can be rotated as indicated by arrow head 98 by the rotation by motor 97 of the rod 98 which is fixed to the detector supporting stand 95.

As for the operation procedure, oxygen is jetted from the tip of scarfing nozzles 85 at the position of the defect of the slab 2; in the oxygen-rich atmosphere, Joule heating and arc heating occur between the electrode pipe 13 and the slab 2, whereby the electrode pipe is melted, and at the same time, the scarfing point is heated and its temperature raises to scarfing start temperature. Consequently, instantaneous scarfing initiation is accomplished. In this case, the jetting of oxygen from the tip end of the electrode pipe 13 prior to arc production promotes combustion, resulting in much easier scarfing initiation.

As scarfing initiation is also instantaneous (within 0.5 second) in the case of side scarfing, scarfing can be initiated while the scarfing machine is travelling, that is to say, a flying start in initiating the scarfing is achievable.

In the abovementioned apparatus, the distance between the side 26 of the slab and the scarfing nozzle 85 is measured by the level detector 93, and this measured value is converted into an output signal to be compared with a reference signal corresponding to the predetermined distance. Then, the comparison is fed back as a controlling signal to the motor 99 for automatically adjusting to a pre-determined value the distance to the side 2b of the scarfing nozzle. For this distance, the most preferred value is 5 to 10 mm from the standpoint of scarfing initiation and deepness. If either the level detector 93 or the marking detector 92 extends beyond the end of the slab, the change in signals issued therefrom, will cause the motor 97 to start, thereby rotating the detector supporting stand 95 as indicated by arrow head 98, so that the detectors 92 and 93 will keep their positions over the side 2b of the slab. When the supporting base 81 moves as directed by the arrow head 93 in FIG. 7, it is possible that the bending of the slab will cause the tip end of the scarfing nozzle 85 to deviate from the defect. In the apparatus of FIG. 8, however, the level of the plane 2a of the slab is detected by plane level detector 91, and this detected value is converted into a detection value which controls a motor (not shown) for vertical movement of the supporting base 81 (vertically movable truck), so that the scarfing nozzles 85 are kept a pre-determined distance from the plane 2a of the slab.

In order to ensure scarfing initiation, the electrode pipe 13 is supplied with direct current, and the angle θ of the electrode pipe 13 against the side 2b of the slab (in FIG. 7) is set between 30° and 90°. Furthermore, Joule heating at the short-circuit and arc heating are produced by the contact between the electrode pipe 13 and the side 2b of slab which thereby heat and melt the surface of slab. At the same time, the temperature of the scarfing point raises to a temperature for scarfing initiation. When the scarfing initiation is over, the motor 87 is adjusted so as to take away the electrode pipe 13.

As mentioned above, in the case of the slab side scarfing machine, the level of the plane of the to-be-scarfed metal material is detected by the plane level detector so as to vertically move the scarfing nozzles 85; the distance between the scarfing nozzles 85 and the side of the metal material is measured for the horizontal movement of the scarfing nozzles 85. These measurements ensure scarfing initiation and prevent failure, particularly failure from excessively deep scarfing, by keeping the scarfing nozzles at a pre-determined position irrespectively of the unevenness of the side surface of the to-be-scarfed metal materials. Therefore, the scarfing nozzles never deviate from the defects on the side of the metal material.

Also, it is possible to combine the apparatus of FIG. 8 with the plane scarfing machine, so as to do plane scarfing and side scarfing at the same time. In this case, the plane level detector 91 is that of the plane scarfing machine, and the supporting base 81 vertically moves in connection with the vertical movement of the plane scarfing machine. As for the other operation procedure of side scarfing, refer to that of the plane scarfing.

Figure 9C:
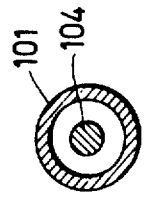
FIG. 9 (a), (b) and (c) are sections of an embodiment of the consumable electrode pipe used for the scarfing method of the present invention.
Figure 9B:
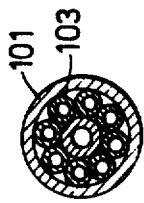
Figure 9A:
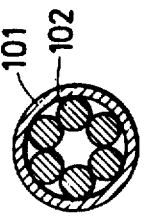

An embodiment of the consumable electrode pipe of the present invention is shown in FIG. 9 a, b and c. The electrode pipe shown in FIG. 9 a is thin pipe 101 made of mild steel with six threads of core wire 102 distributed along the inner circumference thereof. The electrode pipe shown in FIG. 9 b is thin pipe 101 with a plurality of hallow core pipes inserted therein. The electrode pipe shown in FIG. 9 c is a thin pipe 101 with one piece of electrode rod 104 inserted therein. Any one of the abovementioned electrode pipes should have such construction to allow free passage of oxygen.

As for the scarfing machine shown in these figures, it is so constructed to move itself, but, according to the present invention, it is also possible that the scarfing machine may be fixed, and the slab be moved by appropriate transportation means, hence there will still be relative movement between the scarfing machine and the to-be-scarfed material (slab). As for the consumable electrode pipe, it may be made long and fed by reel or otherwise, as well as made into straight rods of set lengths.

What is claimed is:

1. In the method of scarfing surface defects of to-be-surfaced metal material as said material is moving relative to the scarfing machine with scarfing nozzles, the improvement, which comprises a step of supplying oxygen into a consumable electrode pipe so provided as to be directed to a scarfing point detected on the surface of said to-be-scarfed metal material for jetting the oxygen from the tip of said electrode pipe; a step of lowering said electrode pipe until its tip contacts said metal material; a step of heating rapidly the contacting portion, respectively, of said electrode pipe and of said metal material with electrical energy and heat of oxidation so that the temperature of such portion may rise to the scarfing start temperatue; and a step of initiating the scarfing process instantaneously from such temperature rising portion with the oxygen jetted from said scarfing nozzles.

2. The method claimed in claim 1, wherein the distance between the scarfing nozzles and the to-be-scarfed metal material is 5 – 10 mm.

3. The method claim in claim 1, wherein the consumable electrode pipe is slanted against the to-be-scarfed metal material at an angle between 30° and 90°.

4. The method claimed in claim 1, wherein DC current is supplied to the consumable electrode pipe.

5. The method claimed, in claim 1, wherein during the contact between the electrode pipe and the to-be-scarfed metal material, the feeding speed of the electrode pipe is maintained at a certain level before arc production between said electrode pipe and said to-be-scarfed metal material; and is lowered at the time of arc production after Joule heating.

6. The method claimed in claim 5, wherein the feeding speed of the electrode pipe is controlled by means of a feeding program positioner of electrode pipe, an arc-voltage setting device, a DC source, an electrode controller and a motor controlling circuit.

7. The method claimed in claim 1, wherein one or more pieces of core wire are used in a thin pipe used as the electrode pipe.

8. In the method of scarfing defects on the side surface of the to-be-scarfed metal material as said material is moving relative to the scarfing machine with scarfing nozzles, the improvement, which comprises a step of supplying oxygen into the consumable electrode pipe so provided as to be directed to a scarfing point detected on the side surface of said to-be-scarfed metal material for jetting the oxygen from tip of said electrode pipe; a step of feeding said electrode pipe toward the scarfing point until its tip contacts the side surface of said metal material; a step of heating rapidly the contacting portion, respectively, of said electrode pipe and of said metal material with electrical energy and heat of oxidation so that the temperature of such portion may rise to the scarfing start temperature; and a step of initiating the scarfing process instantaneously from such temperature rising portion with the oxygen jetted from said scarfing nozzles.

9. An apparatus for scarfing surface defects of to-be-scarfed metal material, with movable scarfing nozzles for jetting oxygen toward a scarfing point on the surface of the to-be-scarfed metal material, which comprises the consumable electrode pipe provided opposite to said scarfing nozzles so as to be directed to a scarfing point on said to-be-scarfed metal material; an electrode pipe feeding device for feeding its supported consumable electrode pipe to the scarfing point and taking it up; and an oxygen supplying device connected with the upper part of said electrode pipe feeding device for supplying oxygen into said electrode pipe.

10. The apparatus claimed in claim 8, wherein plural pieces of electrode pipe are accomodated in the electrode pipe feeding device, and each of said pieces of electrode pipe is connected with the respective electrode pipe casing for sending it to said electrode pipe feeding device.

* * * * *